United States Patent [19]

Baum

[11] 4,280,594
[45] Jul. 28, 1981

[54] BRAKE WEAR INDICATOR

[75] Inventor: Heinz W. Baum, Saarbrucken-Dudweiler, Fed. Rep. of Germany

[73] Assignee: Lucas Industries Limited, Birmingham, England

[21] Appl. No.: 58,387

[22] Filed: Jul. 17, 1979

[51] Int. Cl.[3] ............................................. F16D 66/02
[52] U.S. Cl. ................................. 188/1 A; 340/52 A
[58] Field of Search ............ 188/1 A; 340/52 A, 52 B

[56] References Cited

U.S. PATENT DOCUMENTS 3,808,593  4/1974  Kopernik et al. ............... 188/1 A X Primary Examiner—Duane A. Reger
Attorney, Agent, or Firm—Scrivener, Clarke, Scrivener and Johnson

[57] ABSTRACT

A disc brake wear indicator which in use is secured within a bore in the carrier member of a pinsliding caliper disc brake comprises electrical conductors which are normally electrically connected by a ring secured to a sleeve. A probe is secured to one of the caliper pins by a spring ring and is coupled to the sleeve by a lost-motion connection formed by flanges. The indicator is secured in the bore when the brake pads are new, and because the ring will grip the pin-bore at any point along its length the initial position of the flanges shown in the drawings is always obtained regardless of manufacturing tolerances in the brake components. After predetermined brake pad wear the pin will have moved along the bore sufficiently to bring the flanges into contact and move the ring away from the conductors to provide a brake pad wear signal.

7 Claims, 5 Drawing Figures

BRAKE WEAR INDICATOR

This invention relates to a brake wear indicator for indicating the limit of permissible wear of a brake friction lining of a braking system. A preferred embodiment of the invention is suitable for indicating the limit of permissible wear of the friction lining of a vehicle disc brake.

Various devices have been proposed for providing an indication of the limit of permissible wear of a brake friction lining, i.e. to provide an indication that the lining is due for replacement. Many of the proposed indicating systems utilise a mechanical or electrical contact which engages the brake disc when friction lining wear has reached the permissible limit to provide a mechanically generated audible indication, or to operate an electrical circuit which provides a visual or audible warning signal. Such wear indicating systems are not, however, entirely satisfactory since the engagement of the contact with the surface of the brake disc may cause damage to the brake disc. Further, in such systems the contact is usually worn or destroyed in the process of generating a warning signal, and must accordingly be replaced when the friction lining is replaced. This adds to the difficulty and cost of replacing the friction lining.

It has also been proposed to provide a warning system in which the relative movement of a member coupled to the friction lining and a further member is used to trigger a warning system. However, previously proposed wear indicating systems of this type suffer from the disadvantage that they cannot readily take account of variations in manufacturing and assembly tolerances between the various components of the braking system. Thus, actuation of the warning system does not necessarily occur at the exact moment when the limit of permissible wear is reached. Manufacturing and assembly tolerances may be such that the warning system is triggered before the friction lining has reached the limit of permissible wear, in which case the lining will be replaced prematurely, or may mean that the warning system is not triggered until the friction lining has worn beyond the permissible limit.

According to one feature of the present invention there is provided a brake wear indicator for indicating the limit of permissible wear of a brake friction lining which is coupled to a first member which moves relative to a second member as the friction lining wears, the indicator comprising a first part which, in use, is coupled to the first member; a second part which, in use, is coupled to the second member and which is movable relative to the first part; a stop defining a first relative position of the first and second parts; and indicator means operable to indicate a predetermined amount of movement of the first part relative to the second part from the said first relative position, the arrangement being such that with the first and second parts in the said first relative position, the first part can be coupled to the first member and the second part can be coupled to the second member over a range of relative positions of the first and second members.

With an embodiment of the present invention friction lining wear is proportional to the movement of the first and second members, and the indicator is effective to provide a warning signal when movement of these members reaches a predetermined amount. However, measurement of the movement of the first and second members is not affected in any way by the initial relative positions of the members, and accordingly is not effected by manufacturing or assembly tolerances of the various components of the braking system. Further, the indicator is not damaged in any way during brake wear and can be reset when new friction linings are fitted and will operate to provide indication when the new friction linings become worn. In a preferred embodiment, since the brake system is not disassembled during replacement of the friction lining it is unnecessary to reset the coupling between the first part and the first member or the second part and the second member when friction linings are replaced. Accordingly once the initial setting up of the indicator had been carried out during assembly of the braking system no further adjustment of the indicator mechanism is necessary during the life of the braking system.

The above and further features and advantages of the invention will become clear from the following description of an embodiment thereof, given by way of example only, reference being had to the accompanying drawings wherein.

Figure 1:
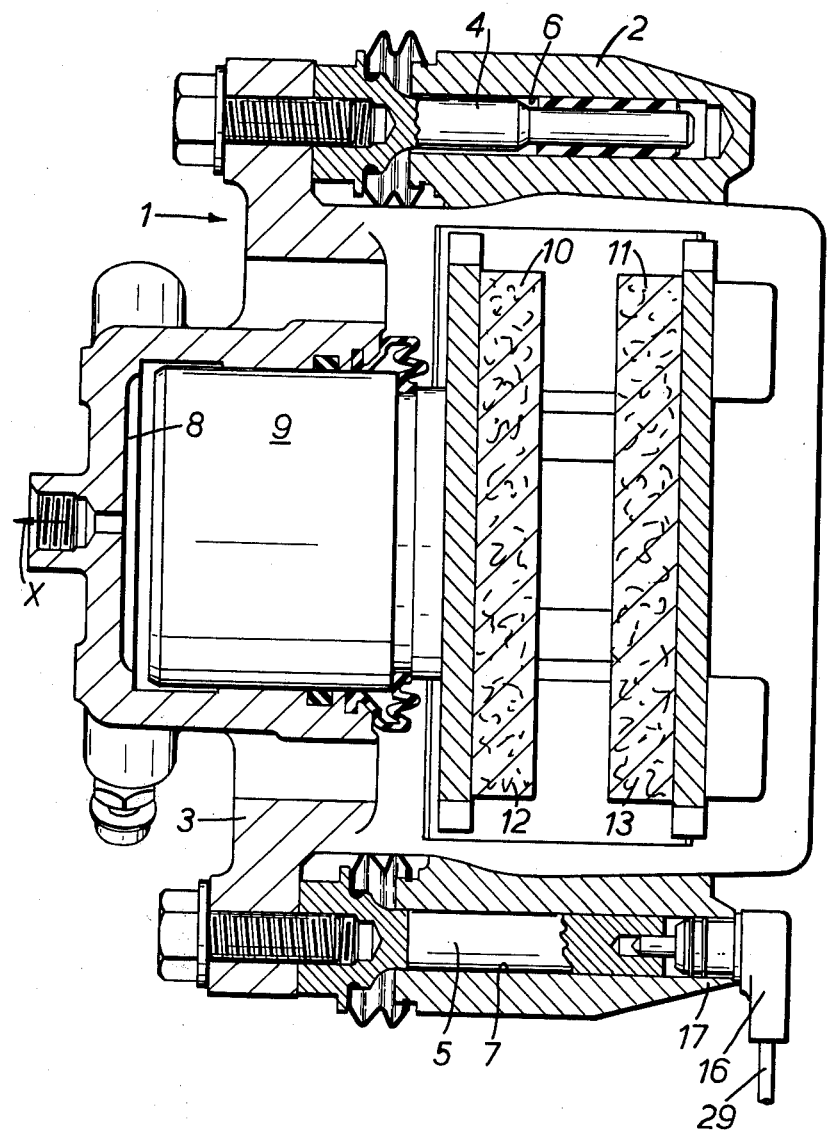
FIG. 1 is a view partly in section of a pin-sliding caliper disc brake, shown partly in section.

Referring to the drawings there is shown a pin-sliding caliper disc brake 1, the disc having been omitted in the interests of clarity. The disc brake 1 comprises a carrier or torque member 2 which is rigidly mounted on the chassis of a vehicle, and a caliper member 3 slidably mounted on the carrier member 2 by means of pins 4,5 which are secured to the caliper member and slide in respective bores 6,7 in the carrier member. A hydraulic cylinder 8 is formed in the carrier member and is provided with a piston 9 which directly engages the backing plate of a direct acting brake pad 10. An indirect acting brake pad 11 is mounted on the caliper member, and each brake pad 10,11 comprises in addition to its respective backing plates a respective friction lining 12,13. In use, application of hydraulic pressure to the cylinder 8 causes the piston 9 to move the direct acting brake pad 10 into engagement with the brake disc. This produces a reaction force which causes the caliper member to slide on pins 4,5 to bring the indirect acting brake pad 11 into engagement with the other face of the disc.

After each application of the brakes the brake pads remain in light rubbing contact with or just spaced from the surface of the disc. Thus, as the friction lining 13 progressively wears away the caliper member 3 progressively moves in the direction of the arrow X relative to the carrier member. This movement has the effect of moving the pin 5 progressively to the left as viewed in FIGS. 1 and 2 relative to the bore 7.

Considering the situation when the disc brake is new and the friction linings 12,13 are in light rubbing contact with the brake disc, the pin 5 will be at an "initial" position within the bore 7. This "initial" position will be determined not only by the thickness of the friction lining 11, but also by the various manufacturing and assembly tolerances of the other components of the braking system. For example, the distance between the end face 14 of the carrier member and the end face 15 of the pin will depend directly on the length of the pin 5 and on the size of the carrier member casting and indirectly on many other dimensions and angles of the various components of the disc brake. Accordingly, appreciable variations in this distance are liable to occur between different examples of a mass-produced disc brake.

Figure 2:
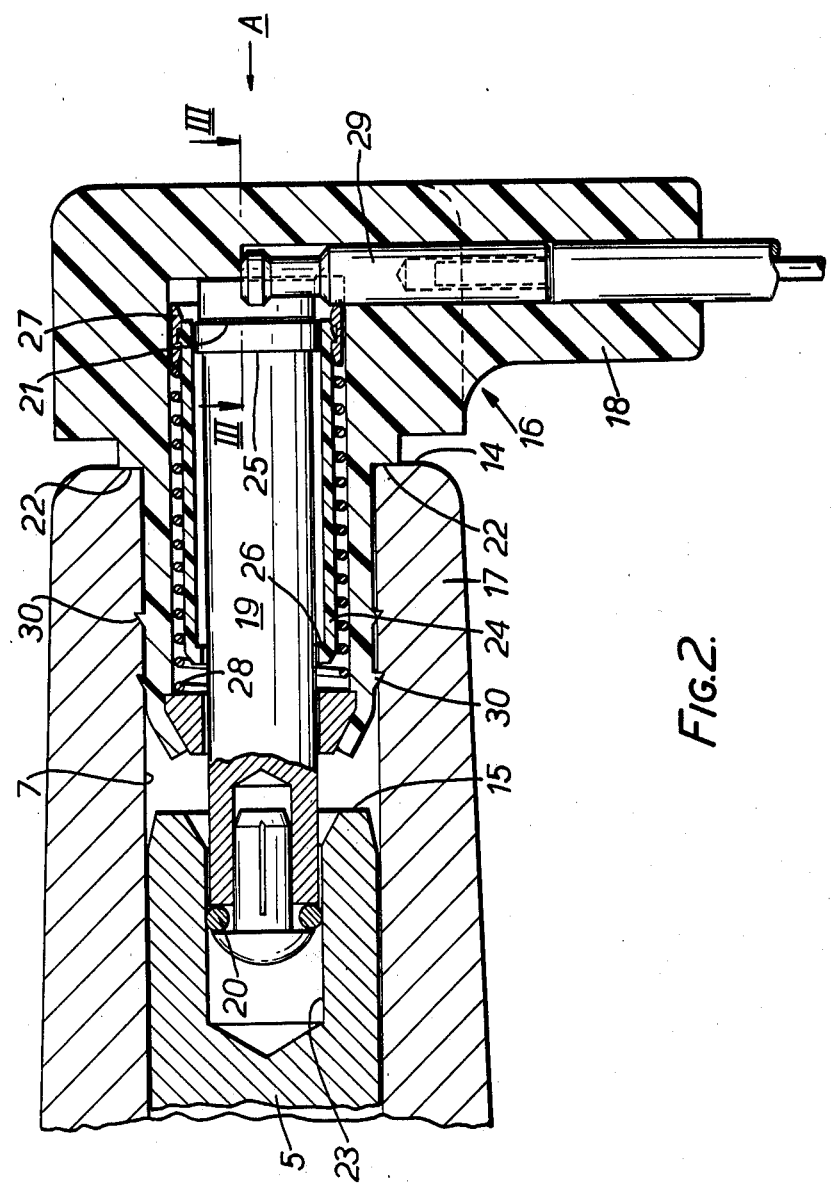
FIG. 2 is an enlarged sectional view of the wear indicator of the disc brake of FIG. 1.

Referring now to FIG. 2 a brake wear indicator 16 is connected between the end portion 17 of the carrier member and the pin 5. The indicator 16 comprises a casing 18 which is secured to the end portion 17 of the carrier member and a probe 19 which is secured by means of a spring ring 20 to the pin 5. A stop 21 is provided within the casing 18 and is engageable by the end of the probe 19 to limit movement of the probe into the casing.

In order to locate the wear indicator 16 the wear indicator is offered up to the bore 7 and inserted until a face 22 on the casing abuts the end face 14 of the end portion 17 of the carrier member. This movement will cause the end of the probe 19 to enter a bore 23 formed in the end of pin 5, the resistance to movement of the probe into the bore 23 provided by the spring 20 ensuring that the probe 19 remains in contact with the stop 21. Once the end of the probe 19 has been located within the bore 23 a considerable force is required to move the probe relative to the pin 5 in the direction tending to withdraw the probe from the bore 23. It will be appreciated that the wear indicator can be satisfactorily located in this manner provided that, when the faces 14,22 are in abutment the spring ring 20 is located somewhere along the length of the cylindrical portion of the bore 23. Accordingly, the wear indicator can be satisfactorily located over a range of relative positions of the pin 5 and the end portion 17 of the carrier member.

The wear indicator 16 is originally positioned when the brake pads 10,11 are new and in light rubbing contact with the brake disc. Thereafter, wear of the friction lining 13 which occurs in use causes the pin 5 to move to the left (as viewed in FIGS. 1 and 2) relative to the end portion 17 of the carrier member, drawing with it the probe 19. The probe 19 moves freely through a sleeve 24 located within the casing 18 until an outwardly directed flange 25 on the end of the probe 19 engages an inwardly directed flange 26 formed on the end of sleeve 23. The amount of movement of the probe 19 between its initial position as illustrated in FIG. 2 and the position in which the flanges 25,26 engage is equal to the permissible wear of the friction lining 13.

Any further wear of the friction lining 13 causes the probe 19 to draw the sleeve 24 with it, which in turn moves a metal ring 27 to the left against the bias of a coil spring 28.

Figure 3:
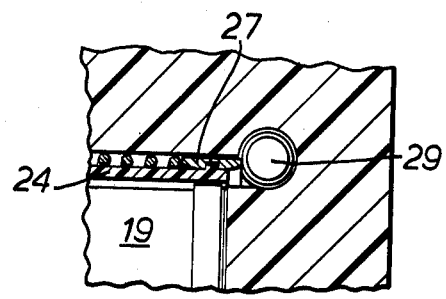
FIGS. 3 and 4 show respectively a half-section on the line 3—3 of FIG. 2 and a half elevational view in the direction of the arrow A of FIG. 2.
Figure 4:
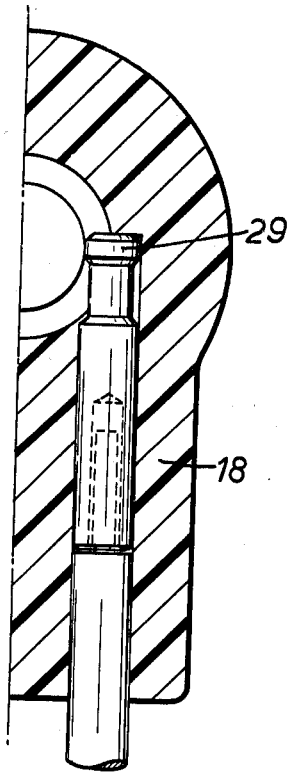

Referring to FIGS. 3 and 4 a pair of electrical conductors 29 (only one of which is illustrated in the drawings but the other of which is located symmetrically on the other side of the centre line of the indicator) are provided in the casing 18. Under normal operating conditions, the conductors 29 are electrically connected by the metal ring 27. However, when the metal ring 27 is moved to the left as described above electrical connection between the two conductors 29 is broken and a suitable warning signal is given.

When the friction lining 13 is replaced by a new friction lining of substantially the same thickness as the original friction lining the caliper member is returned to its original initial position relative to the carrier member, and the components of the indicator 16 are returned to their initial configuration as illustrated in FIG. 2. It is not therefore generally necessary to re-position the indicator when the friction linings are replaced. Accordingly, the casing 18 can be provided with serrations 30 to provide a permanent connection between the casing 18 and the end portion 18 of the carrier member, and the indicator will remain in position during the life of the disc brake.

Figure 5:
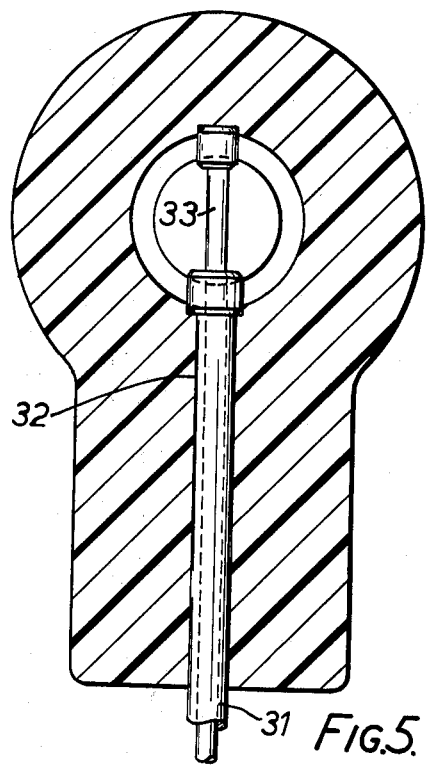
FIG. 5 is an end view of a modified wear indicator.

In a modification illustrated in FIG. 5 a single coaxial cable 31 is used in place of the two conductors 29. In this modification the conductive sheath 32 of the coaxial cable terminates on one side of the ring 27, whilst the central conductor 33 terminates on the diametrically opposed side of the ring. Thus, when the ring is moved by the sleeve 24 the electrical connection between the sheath and the central conductor is broken.

What is claimed is:

1. A brake wear indicator for indicating the limit of permissible wear of a brake friction lining which is coupled to a first member which moves relative to a second member as the friction lining wears, the indicator comprising a first part which, in use, is coupled to the first member; a second part which, in use, is coupled to the second member and which is movable relative to the first part; a stop defining a first relative position of the first and second parts; and indicator means operable to indicate a predetermined amount of movement of the first part relative to the second part from the said first relative position, the indicator means including first and second electrical conductors, and a third electrical conductor spring biased to maintain electrical contact between the first and second conductors until said predetermined amount of movement has occurred, the third electrical conductor being housed within one of the indicator parts and being coupled to the other of the indicator parts by a lost motion connection to provide for said predetermined amount of movement before the third conductor is moved to break electrical contact between the first and second conductors, the arrangement being such that with the first and second parts in the said first relative position, the first part can be coupled to the first member and the second part can be coupled to the second member over a range of relative positions of the first and second members.

2. A brake wear indicator according to claim 1 wherein the said other of the indicator parts includes a rod having an outwardly directed flange at one end, and wherein the lost motion connection comprises a sleeve surrounding the rod and having an inwardly directed flange to engage the outwardly directed flange of the rod when said predetermined amount of movement of the first part relative to the second part has occurred, the third electrical conductor being secured to the sleeve for movement therewith.

3. A brake wear indicator according to claim 2 or 1 wherein the second member comprises a bore and the first member comprises a pin which slides axially in the bore as the friction lining wears, and wherein the second part of the indicator comprises a plug which, in use, is secured in the bore and the first part of the indicator comprises a probe which, in use, extends through the bore and is secured to the pin.

4. A brake wear indicator according to claim 3 wherein the pin includes an axially extending bore and the probe includes means for gripping the wall defining the bore.

5. A brake wear indicator according to claim 4 wherein the probe is a push-fit within the pin bore.

6. A brake wear indicator according to claim 4 or claim 5 wherein the gripping means comprises a spring ring secured to the end of the probe.

7. A brake wear indicator for indicating the limit of permissible wear of a brake friction lining which is coupled to a first member of a brake mechanism which moves relative to a second member of the brake mechanism as the friction lining wears, the first and second members being members which are not dis-assembled when the friction lining is replaced during service, the indicator having first and second parts and comprising:

a stop defining a first predetermined relative position of the first and second parts with respect to each other;

an indicator device operable to indicate a predetermined amount of movement of the first part relative to the second part from the said first relative position;

means for coupling the first part to the first member; and means for coupling the second part to the second member, the coupling means being operative during assembly of the brake mechanism to effect said couplings with the first and second parts in their first predetermined relative position with respect to each other, regardless of variations in the relative positions of the first and second members due to manufacturing tolerances.

* * * * *